Figure 1:
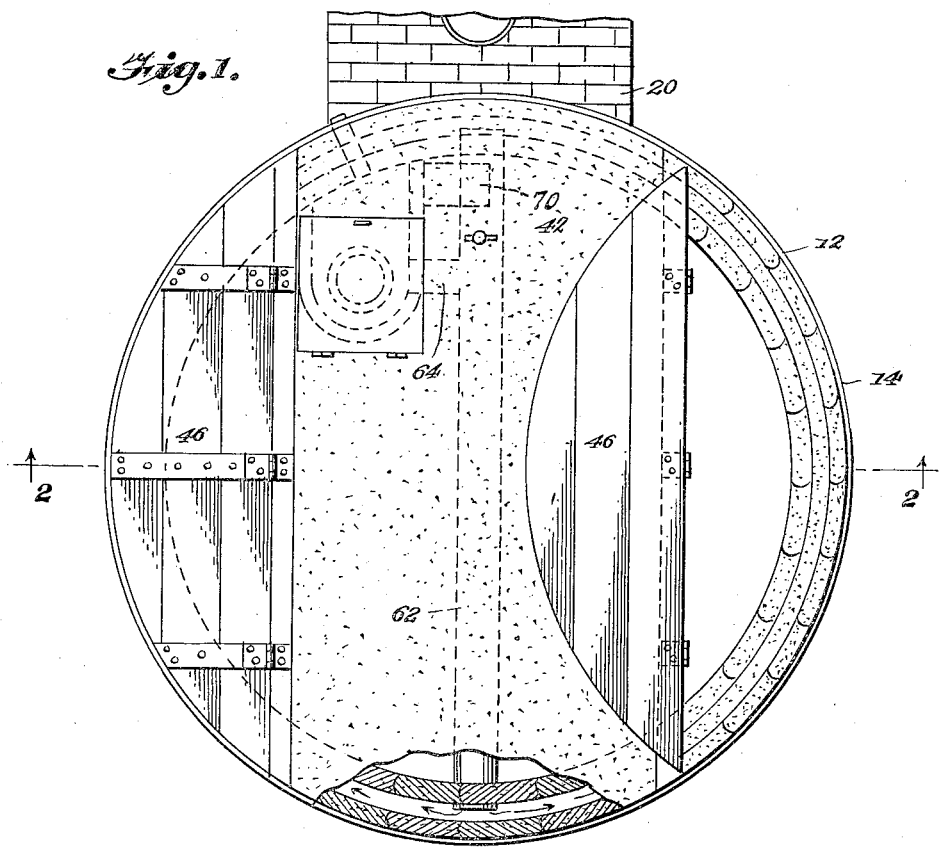

July 4, 1939.  W. W. KREFT  2,164,716
STOCK WATERING DEVICE
Filed Sept. 3, 1937   3 Sheets-Sheet 1

Inventor
W. W. KREFT

July 4, 1939.  W. W. KREFT  2,164,716
STOCK WATERING DEVICE
Filed Sept. 3, 1937   3 Sheets-Sheet 2
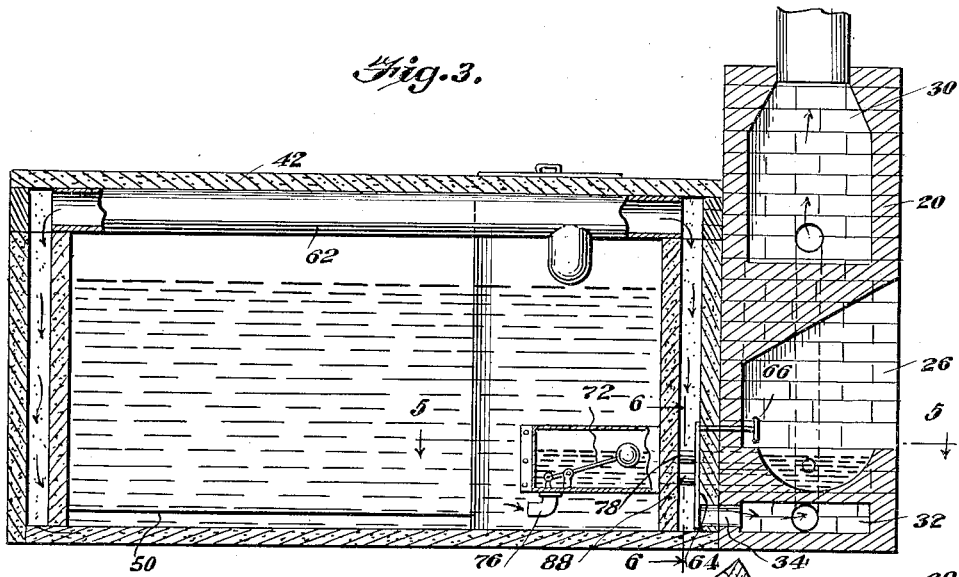
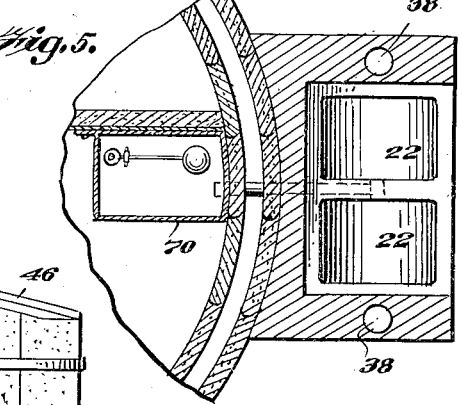
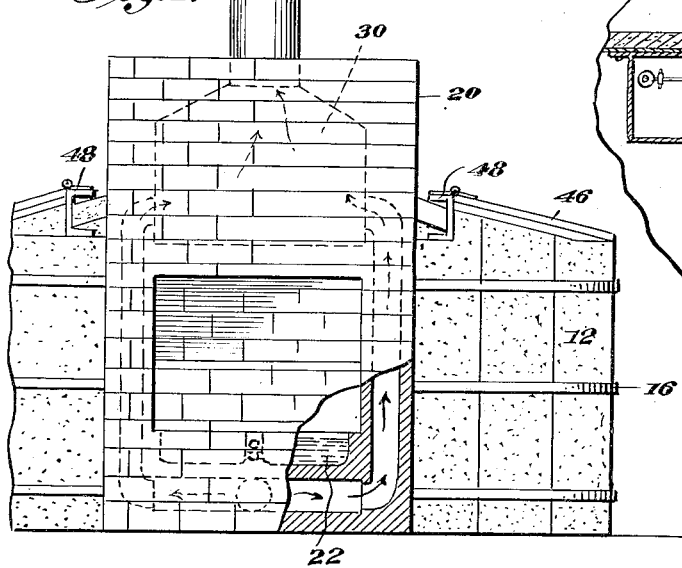
Inventor
W. W. KREFT
By L. Edw. Flaherty
Attorney

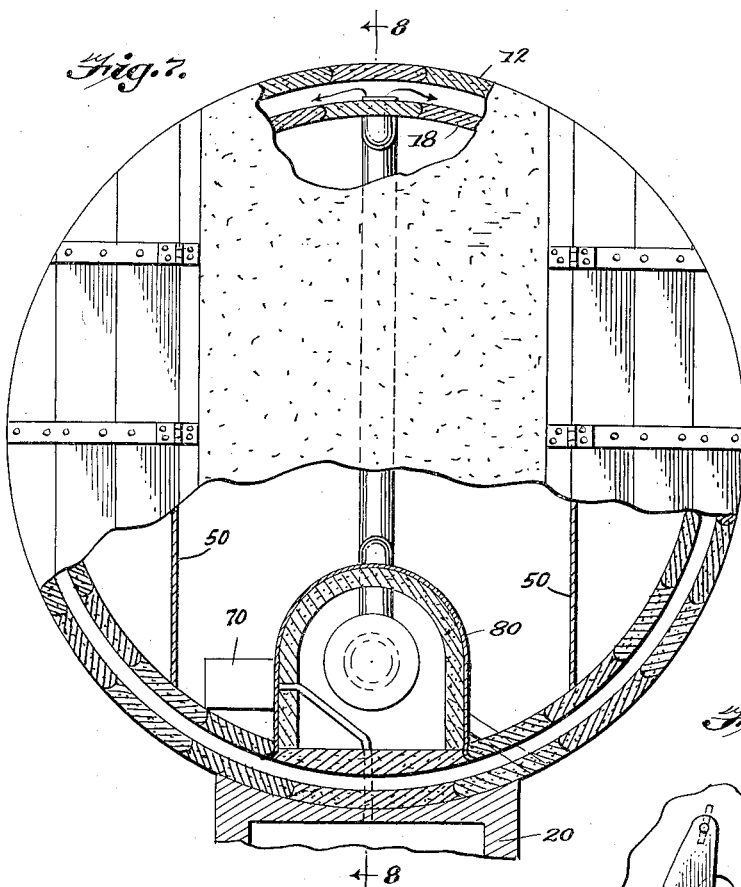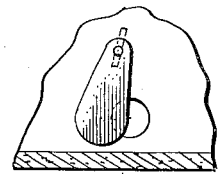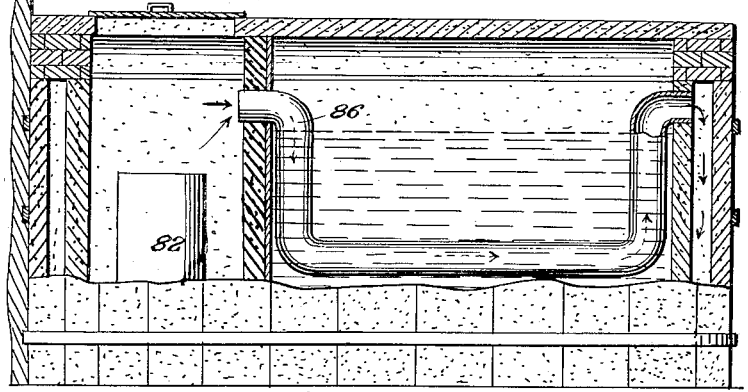

Patented July 4, 1939

2,164,716

UNITED STATES PATENT OFFICE 2,164,716

STOCK WATERING DEVICE

Walter W. Kreft, Yetter, Iowa

Application September 3, 1937, Serial No. 162,340

3 Claims. (Cl. 119—73)

The present invention relates to a stock watering device, and more particularly to a device of this character which is adapted to prevent the water therein from freezing.

One of the objects of the present invention is to provide a novelly constructed live stock watering tank which is provided with novel means for efficiently heating the water to maintain the same at a temperature sufficient to prevent freezing of the water thereof.

A still further important object of the invention is to provide in combination with a live stock watering tank novel heating means which operates at a low cost.

A still further important object of the invention is to provide a novel structure of this character which not only utilizes the direct heat from the heating element, but also the smoke therefrom for heating the water.

A still further important object of the invention will be found to reside in the novel arrangement of the float valve structure therefor which prevents the freezing thereof.

Figure 2:
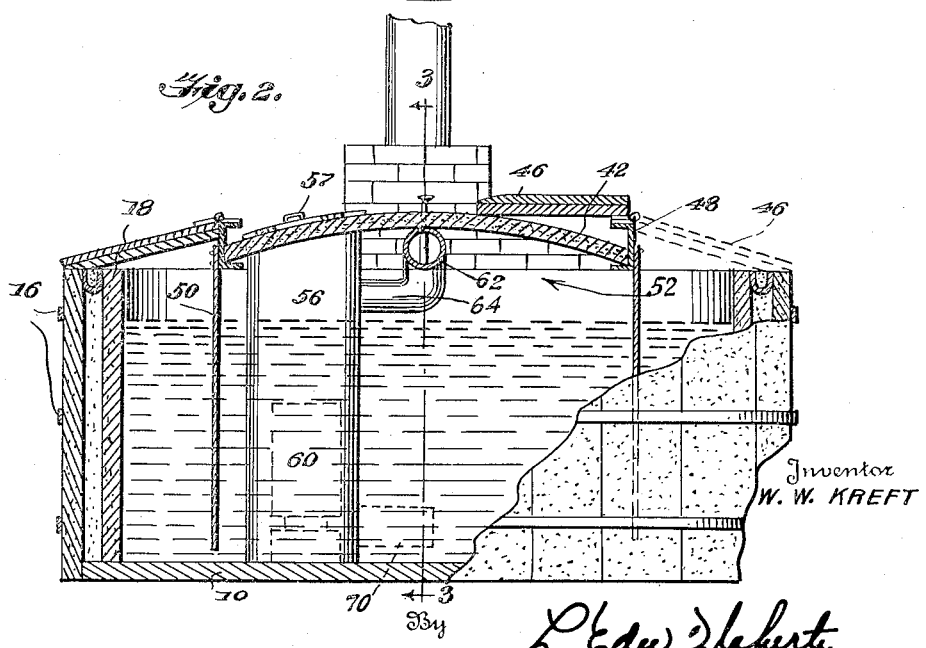

Other objects including simplicity in construction and low cost of manufacture will become apparent from a study of the accompanying drawings in which corresponding parts are designated by similar reference numerals and in which:

Figure 1 is a plan view of the device with parts broken away,

Figure 2 is a vertical sectional view of Figure 1 taken on line 2—2 thereof looking in the direction of the arrows, Figure 3 is a longitudinal vertical sectional view of Figure 2 taken on line 3—3 looking in the direction of the arrows, Figure 4 is a fragmentary front elevational view of the device, Figure 5 is a horizontal sectional view of Figure 3 taken on line 5—5 thereof looking in the direction of the arrows, Figure 6 is a fragmentary vertical sectional view of Figure 3 taken on line 6—6 thereof looking in the direction of the arrows and showing the construction of the slide valve for controlling the flow of heat, gas and smoke to the chimney, Figure 7 is a plan view partly in section of a modified form of the invention, and Figure 8 is a vertical sectional view of Figure 7 taken on line 8—8 thereof looking in the direction of the arrows.

In the accompanying drawings wherein for the purpose of illustration there are shown preferred embodiments of the invention, the reference numeral 10 generally designates the bottom of the tank which is provided with a tubular upstanding side 12 constructed from a plurality of cement staves 14 which are held in place by means of circular hoops 16 encircling the staves. In spaced relation to the inner side of the upstanding side 12 there is arranged in upstanding relation from the bottom 10 and spacedly from the side a circular wall 18 constructed in the same manner as the side 12. A chimney constructed of a plurality of bricks in any manner and designated by the reference numeral 20 is secured adjacent the front of the aforementioned water tank and as clearly illustrated in Figure 3 it is provided with a pair of communicating live stock watering fountains 22 therein. The front portion of the stack is recessed as at 26 permitting of access by the stock to the fountains. The stack in the usual manner is provided with a flue 30 and an air space 32 is disposed below the watering fountains 22 which as stated communicates by means of the opening 34 with the space between the upstanding walls 12 and 18 of the tank. It will be observed that there are provided on each side of the stack 20 vertically disposed conduits 38 connecting the air space 32 with the flue 30 of the stack. These conduits 38 are disposed on each side of the watering fountains 22 in a novel manner for a purpose to be more hereinafter fully described. Extending longitudinally across the top of the tank and firmly secured thereto is a substantially arch shaped top 42. It will be observed that this top has its longitudinal sides terminating short of the sides of the walls of the tank and has pivotally mounted thereto doors 46 which permit access to the interior of the tank. The doors are secured as clearly illustrated to the top 42 by means of the U-shaped members 48 which members have depending therefrom longitudinally extending partition members 50 which terminate short of the bottom 10 of the tank. It will be observed that these members 50 are secured to the U-shaped supports 48 and maintain a dead air space 52 between the upper level of the water and the underneath side of the top 42. Obviously, the water is inserted in the tank through the openings defined by the doors 46 and may be arranged to any level desired. At a point substantially adjacent the stack or chimney within the central compartment defined by the depending partition members 50 there is arranged an upstanding vertical heating unit enclosure 56 which depends from the top 42 and to which access may be obtained through the removable hinged door 57. The heating unit generally designated by the reference numeral 60 may be of any character desired such as oil or coal heating unit or the like. A conduit 62 extends longitudinally of the top 42 and communicates at its ends with the space between the walls 12 and 18. The conduit 62 is provided with an integral lateral conduit 64 connecting the conduit 62 with the interior of the heating unit enclosure 56 thus conveying the heat from the heating unit to the space between the walls 12 and 18, the water in the tank thus being heated not only by the direct contact of the same with the heating enclosure but also by the circulation of heat around and in the space between the upstanding walls.

As previously described, the heat and gases pass from the space between the walls through the conduit 34 to the space 32 below the fountain to the conduit 38 to the flue 30. Thus the water is not only heated by the heating unit as aforementioned within the tank, but also the hot flue gases through the medium of the novelly arranged opening 32 and conduits 38 maintain the water within the fountains 22 at a predetermined temperature. The temperature of the water in the fountains 22 may be further controlled by means of the adjustable damper 64 by means of the actuating arm 66.

To the side of the heating enclosure 50 and adjacent the stack 20 there is secured a reservoir 70 having disposed therein a float valve of any construction generally designated by the reference numeral 72. The interior of the tank is connected to the bottom of the reservoir 70 by means of the inlet conduit 76 and the water is conveyed to the fountains 22 through the medium of the vertically spaced conduits 78 and 80. It will be observed that the conduits 78 and 80 are vertically spaced the warm water in the reservoir passing from the upper pipe through the fountains 22 returning by means of the lower pipe. The position of the float reservoir obviously will prevent the freezing of the conduits and the valve mechanism.

Referring now to Figures 7 and 8 it will be observed that there is shown a modified form of the invention which comprises the usual tank construction previously described with respect to Figures 1 to 6, inclusive, and the depending partition member. In this form of the invention the heating enclosure 80 is disposed adjacent the stack or chimney 20 and has in the same manner a heating unit of any construction 82 disposed therein. In this form of the invention the conduit 86 is of substantially U-shape depending in the water in the central compartment, the same having one end connected with the interior of the heating unit enclosure and the other end with the air space between the walls. Similarly the stack and float control chamber are of the same construction as described with respect to the other form of the invention. 70 designates the float chamber which is diagrammatically illustrated. It will be apparent in this form of the invention, that the water in the central chamber is additionally heated by means of the depending U-shaped conduit 86 as well as the aforementioned walls.

While there are shown for the purposes of illustration preferred embodiments of the invention, it is to be understood that they are capable of various changes and modifications without departing from the spirit and scope thereof, and it is intended therefor, that only such limitations shall be imposed thereon, as are indicated in the prior art or in the appended claims.

What is claimed is:

1. A stock watering device of the class described comprising, a tank including a bottom and a pair of upstanding spaced concentrically disposed walls, a top secured to said walls having a pair of spaced partition members depending therefrom terminating short of the bottom and dividing said tank into three compartments, said top being provided with means for obtaining access to the outer compartments, a smoke stack having a watering fountain in the lower portion thereof and a flue and an air space disposed below said fountain, said air space being connected to the space between the walls, conduits adjacent said fountain connecting the air space below the fountain with the flue, a heating unit enclosure in said central compartment, a heating unit therein, conduit means connecting the heating unit enclosure with the space between the walls, and means conveying the water from the central compartment to the fountain.

2. A stock watering device of the class described comprising, a tank including a bottom and a pair of upstanding spaced concentrically disposed walls, a top secured to said walls having a pair of spaced partition members depending therefrom and terminating short of the bottom dividing said tank into three compartments, said top being provided with doors for obtaining access to the outer compartments and for filling the same with water, a smoke stack having a watering fountain in the lower portion thereof and a flue and an air space below said fountain, said air space being connected to the space between the walls, conduits adjacent said fountain connecting the air space below the fountain with the flue, a heating unit enclosure in said central compartment, a heating unit therein, a conduit disposed adjacent the underneath side of the top and connected to the interior of the heating unit enclosure and the space between the walls, a reservoir in said central compartment disposed adjacent said heating unit enclosure, a pair of vertically spaced conduits connecting said reservoir with said fountain, and valve control means in said reservoir for controlling the flow of water from the tank to the reservoir.

3. A stock watering device of the class described comprising, a tank including a bottom and a pair of upstanding spaced concentrically disposed walls, a top secured to said walls, said top being provided with depending spaced partition members terminating short of the bottom of the tank and dividing said tank into three compartments, doors in said top for gaining access to the outer compartments and filling the same with water, a smoke stack adjacent the outer wall having a watering fountain in the lower portion thereof, an air space below the watering fountain and the flue therein, said air space being connected with the space between the walls, conduit means adjacent the sides of the fountain connecting the air space below the fountain with the flue, a heating unit enclosure in said central compartment, a heating unit therein, a conduit extending through the water in the central compartment connecting the interior of the heating unit enclosure with the space between the walls, a damper for controlling the flow of heat from the space between the walls to the air space below the fountain, a reservoir in said central compartment, vertically spaced conduits connecting the interior of the reservoir with the fountain for supplying water to the fountain, and float valve control means in the reservoir for controlling the amount of water supply from the tank to the reservoir.

WALTER W. KREFT.